United States Patent
Riddell et al.

[11] Patent Number: 6,012,649
[45] Date of Patent: Jan. 11, 2000

[54] LAWN CHEMICAL DISTRIBUTION SYSTEM

[76] Inventors: Richard C. Riddell; Dorei G. Riddell, both of 17907 Crescent Way, Lutz, Fla. 33549

[21] Appl. No.: 09/183,130

[22] Filed: Oct. 30, 1998

[51] Int. Cl.[7] .................................................. A62C 13/62
[52] U.S. Cl. ........................ 239/307; 239/309; 239/318; 222/88; 141/330
[58] Field of Search .................................... 239/304–307, 239/309, 310, 314, 318, 379; 141/330; 222/81, 88, 85, 86, 145.1, 145.7, 185.1

[56] References Cited

U.S. PATENT DOCUMENTS

| | | | |
|---|---|---|---|
| 3,504,702 | 4/1970 | Collins et al. | 137/604 |
| 3,669,357 | 6/1972 | Overbey | 239/310 |
| 3,749,319 | 7/1973 | Fischer | 239/318 |
| 3,780,910 | 12/1973 | Wagner | 222/95 |
| 4,545,535 | 10/1985 | Knapp | 239/313 |
| 4,881,568 | 11/1989 | Ho | 239/310 X |
| 4,901,890 | 2/1990 | Mivelaz | 239/309 X |
| 4,905,904 | 3/1990 | Ohara et al. | 239/309 X |
| 4,941,806 | 7/1990 | Brown et al. | 239/309 X |
| 5,353,990 | 10/1994 | Williams | 239/313 |
| 5,806,769 | 9/1998 | Womack | 239/310 |
| 5,816,502 | 10/1998 | Sperry et al. | 239/309 X |

FOREIGN PATENT DOCUMENTS

| | | | |
|---|---|---|---|
| 90/10504 | 9/1990 | WIPO | 239/307 |

Primary Examiner—Lesley D. Morris
Attorney, Agent, or Firm—Joseph N. Breaux

[57] ABSTRACT

A lawn chemical distribution system that includes a housing with a protective cover and with an interior that includes numerous canister receiving cavities with canister piercing elements located at the bottom of each cavity which pierces the bottom of a chemical canister inserted therein. The canisters are secured together with a resilient harness that allows all the canisters to be replaced in the receiving cavities in a single motion and also allows a user to replace a single canister if desired. The multiple canisters contain either fertilizer, insecticide, herbicide, fungicide, or combinations thereof and may be activated by in line valves located within the system to add any of the chemicals contained within the canisters, in a metered amount, to an irrigation system that conveniently distributes the chemicals on a lawn or garden.

5 Claims, 3 Drawing Sheets

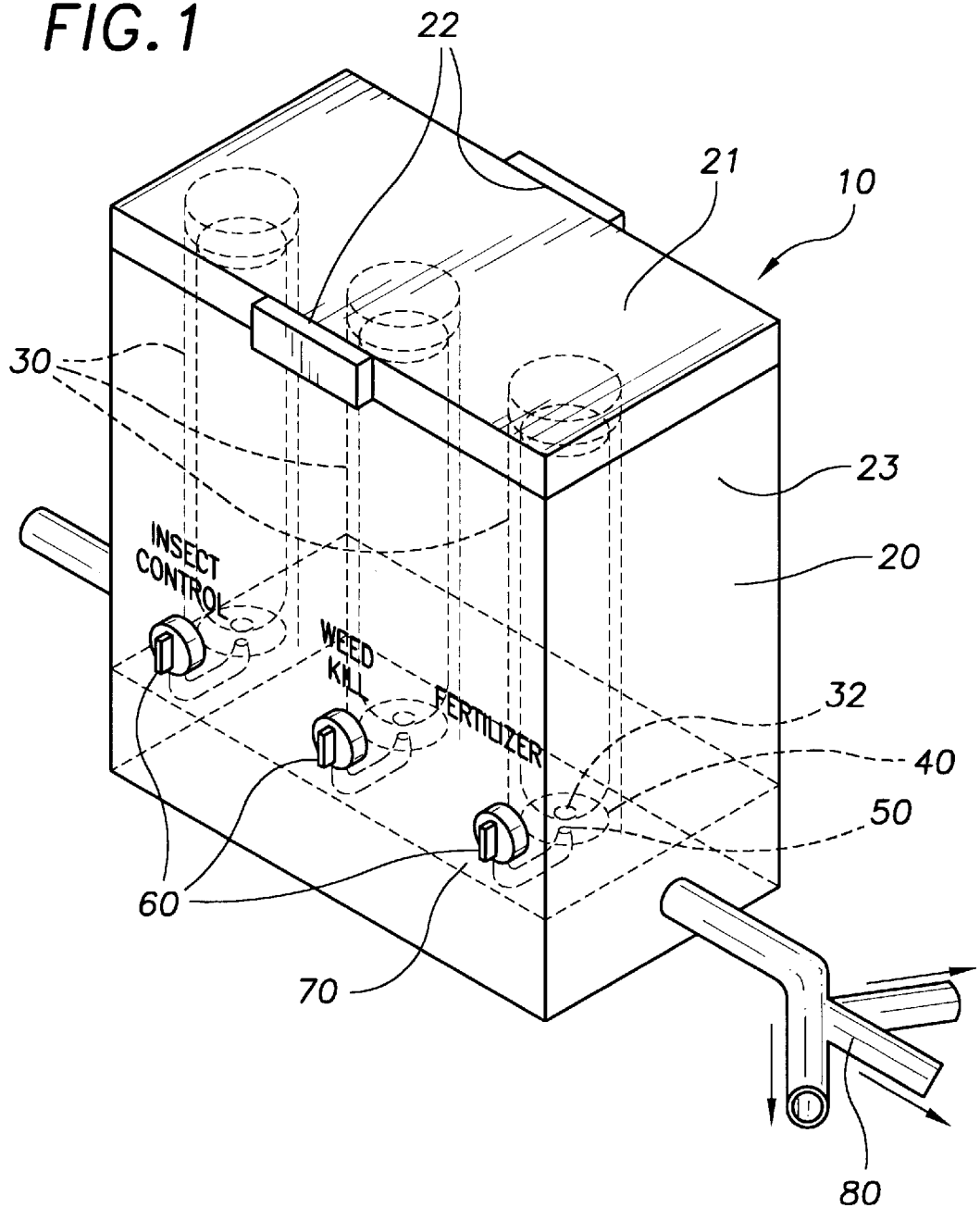

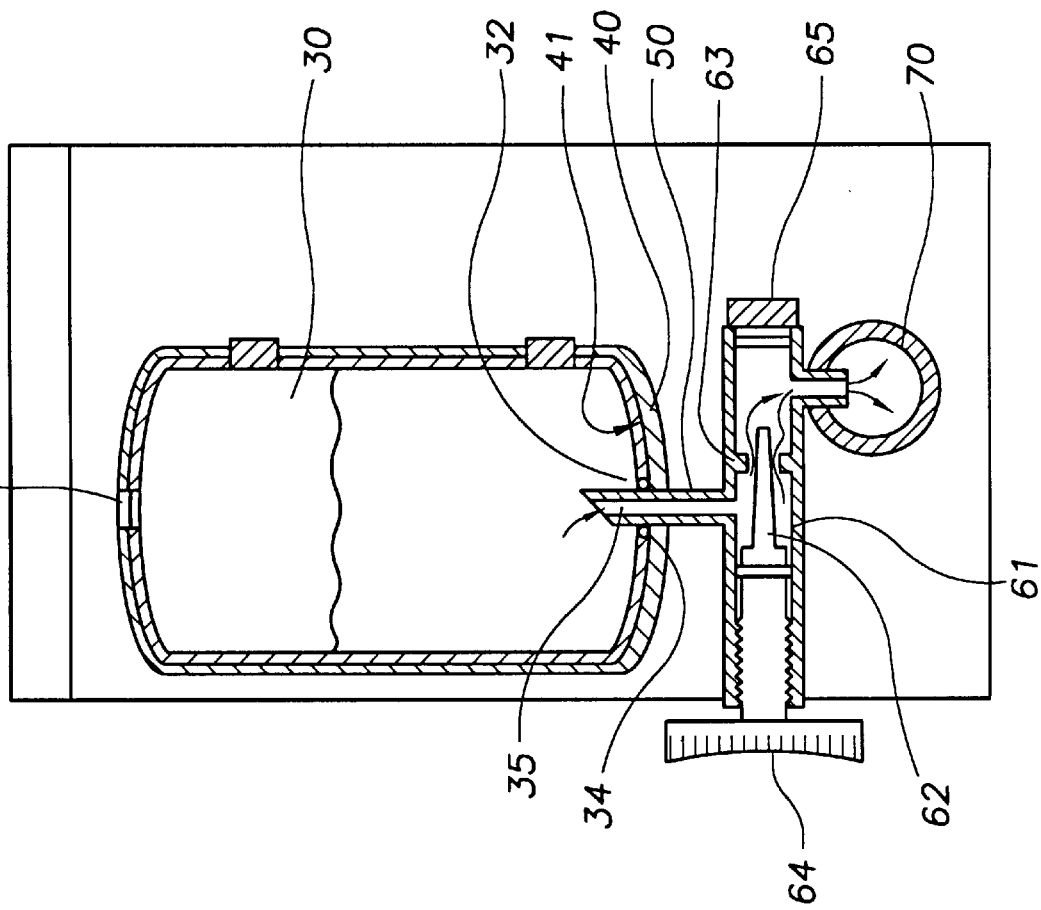
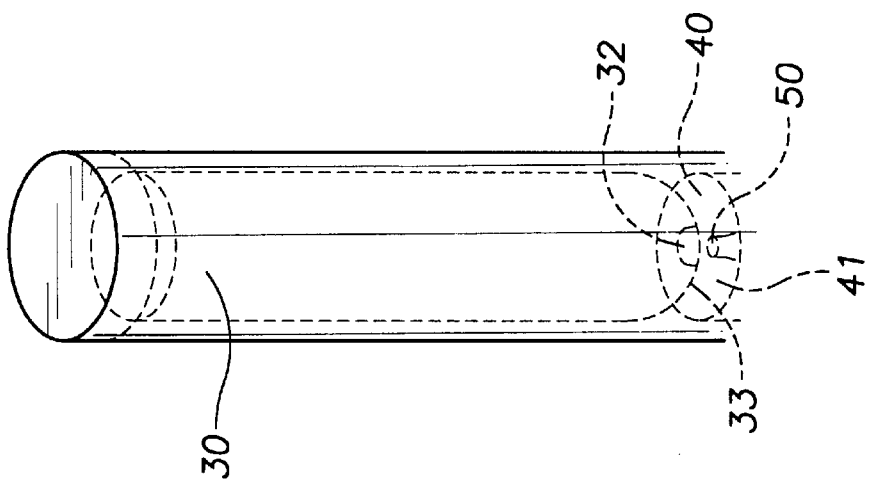

LAWN CHEMICAL DISTRIBUTION SYSTEM

TECHNICAL FIELD

The present invention relates to devices and methods for lawn fertilizers and lawn chemical treatment devices and more particularly to devices and methods for a lawn care chemical distribution system comprising a housing with lawn care chemical cartridge receiving cavities with piercing elements positioned at the bottom of each cavity which receives chemical cartridges therein which are coupled together with a resilient harness which supports all the cartridges as a releasable unit, while the housing includes a cover member that is positioned over the cartridges thereby forming a sealed compartment for holding the cartridges.

BACKGROUND ART

Lawn care chemicals are provided for accomplishing numerous objectives in the lawn and fall within the basic categories of lawn feeding, weed control and insect or fungal control. Typically all of the these chemicals are applyable diluted in water and may be applied by directly adding the chemical compositions to a stream of water which may conveniently be distributed through an irrigation system placed in the lawn. Many times a lawn keeper may need to apply both a lawn fertilizer and a herbicide or a fertilizer and a fungicide or other combinations of chemicals either together at the same time or at different times of the year. Accordingly, a need exists for a lawn chemical distribution system which allows a user to choose between numerous chemicals to be distributed to the lawn through an irrigation system either alone or in combination and easily refill the chemicals in the apparatus.

There have been numerous systems designed which assist in distributing the chemical over a lawn by either hand held devices or in place irrigation systems. These prior devices are extremely useful for their stated purposes but there has never been a device as the present invention which overcomes the problem of providing a means for adding numerous chemicals either alone or in combination to an irrigation system that distributes the chemical over the lawn. The prior art patents which are relevant are as follows: Williams, U.S. Pat. No. 5,353,990; DeMarco, U.S. Pat. No. 5,303,729; Lejnar, U.S. Pat. No. 4,883,086; Knapp, U.S. Pat. No. 4,545,535; Lubsen et al, U.S. Pat. No. 4,382,552; Davison, U.S. Pat. No. 4,218,013; Sheets, U.S. Pat. No. 4,033,509; Sapiano, U.S. Pat. No. 3,791,410; Wagner, U.S. Pat. No. 3,780,910; Fischer, U.S. Pat. No. 3,749,319; Overbey, U.S. Pat. No. 3,669,357; and Collins et al, U.S. Pat. No. 3,504,702.

As Will be described herein the present lawn care chemical distribution system includes a housing which contains numerous chemical canisters in a harness assembly so that the canisters can be easily changed as a unit or separately. The housing has internal receiving areas for receiving the canisters with each receiving area having a piercing element positioned on the bottom thereof so that when the canisters are inserted therein they are pierced thereby allowing the chemical to flow into the distribution system. The housing includes a cover so that the interior of the housing can be sealed.

GENERAL SUMMARY DISCUSSION OF INVENTION

It is thus an object of the invention to provide a lawn chemical distribution system that introduces numerous chemical components, either separately or in combination, into an irrigation system so that the chemical can be easily distributed by the irrigation system.

It is a further object of the invention to provide a lawn chemical distribution system that includes numerous chemical canisters received within a housing unit and which canisters are in metered communication with an irrigation system, and wherein the canisters are secured together utilizing a resilient harness that allows a user to insert all the canisters into the housing unit while independent canisters may also be replaced in the harness.

It is a still further object of the invention to provide a lawn chemical distribution system that includes numerous chemical canisters that are received by canister receiving cavities within the interior of a housing and wherein a piercing element is located at the base of each receiving cavity for piercing the bottom of the canisters that are inserted into the receiving cavities and allowing the chemicals from the canisters to flow into an irrigation system and distributed to a lawn through the irrigation system.

Accordingly, a lawn chemical distribution system is provided that comprises a housing with an interior with a number of canister receiving cavities positioned therein and a number of lawn chemical canisters coupled together with a resilient harness that allows a user to remove or replace all the canisters from the housing in a single motion and further allows the user to replace separate canisters from the harness if desired and wherein the receiving cavities include a piercing element located at the bottom of each cavity which punctures the canister inserted into the cavity and allows the chemical in the canister to flow into the irrigation plumbing and be distributed to the lawn to be treated by the chemical. The housing includes a top portion which seals the interior of the housing thereby protecting the canisters inserted therein.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is an isometric view of the lawn chemical distribution system illustrating the features of the system.

FIG. 2 is an isolated isometric view of a single canister receiving cavity located within the housing of the lawn chemical distribution system illustrating the piercing element located at the bottom of the receiving cavity and the canister located therein.

FIG. 3 is a side view of a single canister positioned within the interior of the system and illustrating the needle valve control positioned on the bottom end of the canister and the flow of chemical from the canister to the irrigation pipe.

EXEMPLARY MODE FOR CARRYING OUT THE INVENTION

Figure 4:
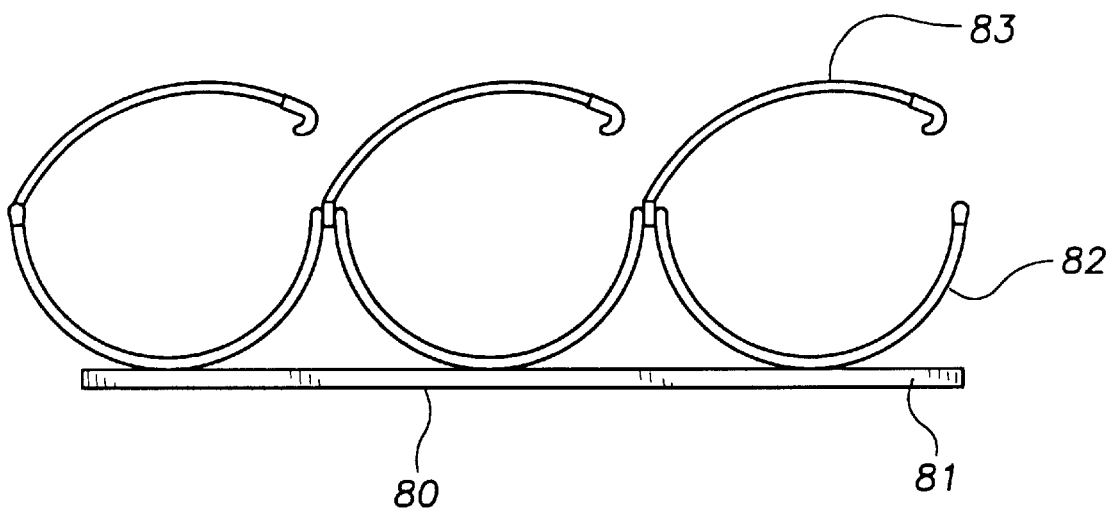
FIG. 4 is a top view of the resilient harness for mounting three chemical canisters to be installed into the interior of the system.

It can be seen from the following description that in use, a user wilt a lawn or garden to be fertilized or cared for with chemicals may install the lawn care distribution system on an existing water supply line to an irrigation system installed in the yard or garden. The user would insert either pressurized or non pressurized chemical canisters with concentrated fertilizer, herbicide, insecticide, fungicide, or combinations thereof or any other chemical desired to be dispensed into the irrigation system by installing the individual canisters on the resilient harness while all canisters are then inserted into the interior of the housing of the distribution system and pushed into the receiving cavities wherein the piercing element located at the bottom of the receiving cavities pierces the cylinders and sealing create a passage way from the interior of the cylinders to the irrigation pipe therein. The user then secures the cylinders in place by the securing straps and adjusts the needle valve control which controls the flow of concentrated chemical from the canisters into the irrigation pipe. The lawn care chemical distribution system provides a very practical and easy to use method of allowing a user to take care of a lawn and/or garden chemical needs without having to resort to different canisters and systems for different chemicals desired to be distributed. Additionally, the system described herein allows a user to remove all canisters in one motion as a unit from the interior of the system and while individual canisters may be added to the harness as desired. Additionally, the individual canisters inserted into the housing interior may be controlled by a metering valve which controls the flow from each canister into the irrigation pipe thereby allowing a user to meter the contents of each of the canisters independently as needed.

Referring to the figures in detail, FIG. 1 illustrates the lawn chemical distribution system generally wherein it includes a housing 20, numerous chemical canisters 30, concave receiving cavity 40, piercing element 50, metering valve and control knobs 60, and internal irrigation pipe 70 which exits the housing 20 to different locations of a lawn and/or garden via pipes 71.

The housing 20 is preferably constructed of plastic and includes a protective cover 21 with handle grips 22. The protective cover protects the interior 23 of the housing 20. The interior 23 is dimensioned to receive numerous chemical canisters 30. The chemical canisters 30 may be supplied either as pressurized or non pressurized vessels. In the case that a non pressurized canister is supplied, a vent orifice 31 is provided on a top portion of the canister. The canisters, regardless of pressurized or non pressurized include a piercing area 32 located on a bottom surface 33 of the chemical canisters 30. The piercing area 32 is preferably centrally located on a curved portion of the bottom surface 33 and is further oriented to be punctured by a piercing element 50. The chemical canisters 30 are also provided as a set of three and may include more or less however the inventor has found that the use of three canisters covers most needs of a lawn care chemicals wherein the canisters may be containers for concentrated fertilizer, herbicide, and/or insecticide. Combinations of chemicals may also be added to canisters depending upon the compatibility of chemicals fur specific uses. Additionally, the use of multiple canisters during one distribution may also be limited based upon compatibility of the chemicals in use and also the times of year and/or desires for chemically treating yards at different times and applications. FIG. 2 illustrates an individual chemical canister 30 in detail which includes an illustration of a convex receiving cavity 40 which is dimensioned to match the curvature of the canisters bottom surface 33 while a top surface 41 of the convex receiving cavity includes a centrally located piercing element 50 which is positioned to pierce piercing area 32 of the canister when the canister is inserted into the receiving cavity.

FIG. 3 is a side view detail of a canister 30 illustrating the piercing element 50 penetrating the piercing area 32 of the canister and positioned on a central location of the convex receiving cavity 40. A sealing "O" ring 34 is provided around the perimeter of the piercing member 50 and provides a seal between the canister bottom surface 33 and the convex receiving cavity top surface 41. FIG. 3 also illustrates the chemical passage way 35 which extends from the piercing element 50 into valve 61 and into irrigation pipe 70. The metering valve 61 as illustrated is a needle valve configuration wherein the needle 62 seats upon valve seat 63 incrementally as knob 64 is rotated. Clean out plug 65 is located on a back end of the valve 61 so that the contents of the valve body can be flushed if necessary. The inventor contemplates numerous needle valves 61 and at least one needle valve for each canister provided in the system. The control knob 64 is mounted to an outside of the housing allowing a user to adjust the flow rate of the chemical constituents as needed for a particular application.

Figure 5:
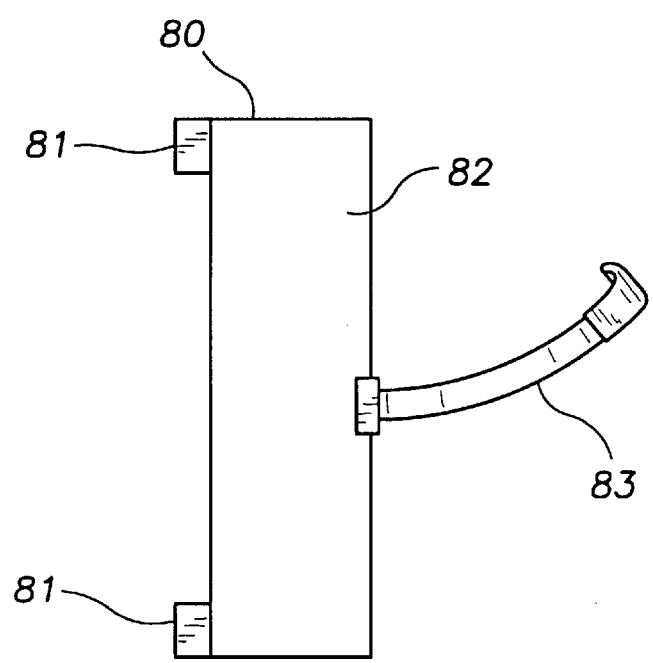
FIG. 5 is a side view of the resilient harness illustrating the framework for the harness and the retaining strap for securing the canister thereto.

A resilient canister harness 80 is illustrated in FIGS. 4 and 5 and allows all of the canisters in a particular system to be removed as one unit. The resilient harness 80 includes a pair of rigid frame supports 81 securing a number of elongated vertically positioned canister receiving mounts with securing straps securing the canisters within the mounts. In use, after the canisters have been attached to the resilient mount, the entire unit is inserted into the interior of the housing and pushed into place puncturing the canisters and allowing a chemical to flow into the valves and ready for use. The resilient harness preferably includes elastic straps 83 which securely hold the canisters in the elongated mount 82. Furthermore, the resilient harness is constructed of plastic to increase the longevity of the apparatus.

The irrigation pipe 70 which extends through the interior of the housing preferably includes a entrance and exit pipe connection so that the system can be easily installed in line of an irrigation pipe. The system may also be designed as a portable unit and installed in line of a water hose if desired. Entrance and exit shut off valves may also be supplied on the entry and exit pipes of the system so that the water pressure can be isolated while removing and installing new canisters.

It is noted that the embodiment of the Lawn Chemical Distribution System described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A lawn chemical distribution system useful for adding lawn care chemicals to a water stream of an irrigation system so that the chemicals can be distributed to the lawn through plumbing comprising the irrigation system wherein the chemical distribution system comprises:

a) a housing with a protective top cover with an interior therein for containing numerous chemical canisters, numerous receiving cavities each for receiving a chemical canister positioned within the interior of the housing, a piercing element located on a bottom portion of each cavity for piercing a bottom of each canister inserted thereon, a valve located between each piercing element and an irrigation pipe and a resilient harness mount for mounting the numerous canisters as a unit so that the canisters can be installed or removed from the interior of the housing in a single unit, b) the chemical canisters further comprise chemical canisters with a rounded bottom portion and a centrally located piercing area located on the bottom portion, c) the receiving cavity further comprises a concave receiving cavity which is dimensioned to match the curvature of the rounded bottom portion of the chemical canisters and wherein the piercing element is centrally located within the receiving cavity, d) the piercing element further comprises a sharpened pipe member protruding from a top surface of the receiving cavity and which provides a passageway from the chemical canister to an irrigation pipe, a sealing o-ring is provided around the piercing element and sealing contacts the top surface of the receiving cavity and the bottom portion of the chemical canister, e) the valve located between each piercing element and the irrigation pipe further comprises a valve which provides a means for control the volume of chemical which flows from each chemical canister to the irrigation pipe, and f) the resilient harness further comprises a rigid frame structure with a number of elongated canister receiving members with canister retaining straps securing the canisters within the receiving members.

2. The lawn chemical distribution system of claim 1, wherein the chemical canisters further comprise: chemical canisters which are provided with chemicals loaded therein and which are pressurized so that the chemical canisters do not require an air vent orifice in order for the chemicals to flow from the canisters.

3. The lawn chemical distribution system of claim 1, wherein the chemical canisters further comprise chemical canisters with chemicals loaded therein and which are not pressurized and which include an air vent orifice on a top surface of the canister for allowing air to flow into the canister as chemical is drained from the canister.

4. The lawn chemical distribution system of claim 1 wherein the needle valve further comprises a needle valve with a clean out plug positioned on a valve body of the needle valve.

5. The lawn chemical distribution system of claim 1 wherein the system further comprises an inlet valve which blocks the flow of water through the irrigation pipe extending through the system.

* * * * *